United States Patent
Shia et al.

(10) Patent No.: US 6,725,882 B1
(45) Date of Patent: Apr. 27, 2004

(54) CONFIGURABLE MICRO FLOWGUIDE DEVICE

(75) Inventors: Tim K. Shia, Taipei (TW); Jhy-Wen Wu, Taipei (TW); Nan-Kuang Yao, Taipei (TW); Yuan-Fong Kuo, Taipei (TW); Shaw-Hwa Pang, Taipei (TW)

(73) Assignee: Industrial Technology Research Institute, Taipei (TW)

( * ) Notice: Subject to any disclaimer, the term of this patent is extended or adjusted under 35 U.S.C. 154(b) by 0 days.

(21) Appl. No.: 10/335,945

(22) Filed: Jan. 3, 2003

(51) Int. Cl.[7] .............................................. F15C 1/04
(52) U.S. Cl. ..................... 137/827; 137/807; 137/828; 137/833; 204/601
(58) Field of Search ................. 137/833, 827, 137/828, 807; 204/601

(56) References Cited

U.S. PATENT DOCUMENTS

| | | | | |
|---|---|---|---|---|
| 5,800,690 A | * | 9/1998 | Chow et al. ................. 204/451 |
| 5,880,071 A | * | 3/1999 | Parce et al. .................. 204/453 |
| 6,062,681 A | * | 5/2000 | Field et al. ..................... 347/65 |
| 6,065,864 A | * | 5/2000 | Evans et al. ............. 366/167.1 |
| 6,167,910 B1 | * | 1/2001 | Chow .......................... 137/827 |
| 6,321,791 B1 | * | 11/2001 | Chow .......................... 137/833 |
| 6,349,740 B1 | * | 2/2002 | Cho et al. .................... 137/827 |
| 6,360,775 B1 | * | 3/2002 | Barth et al. .................. 137/828 |
| 6,508,273 B1 | * | 1/2003 | Van Den Berg ............ 137/827 |
| 6,520,197 B2 | * | 2/2003 | Deshmukh et al. ............. 137/3 |

* cited by examiner

Primary Examiner—A. Michael Chambers
(74) Attorney, Agent, or Firm—Bacon & Thomas, PLLC

(57) ABSTRACT

Disclosed is a micro flowguide device comprising: a micro channel comprising at least one bubble trap to retard bubbles positioned in said bubble trap; an electrolytic bubble generating device to generate bubbles in said fluid by an electrolytic reaction; and a pressure source to supply a suited pressure to said fluid to pass through said micro channel; wherein said electrolytic bubble generating device causes bubbles to be generated at areas adjacent to said at least one bubble trap.

Electrolytic bubbles are generated through a, localized electrolytic reaction enabled by the exposure of a set of DC-source-connected electrodes inside a conduit branch. Accumulated bubbles will be trapped and kept at several traps of the invented flowguide. When the backward pressure of trapped bubbles is rising to the level of forward pressure head, flow speed reduces to zero and channel branch is shut down.

5 Claims, 3 Drawing Sheets

301

302

303

304

305

306

CONFIGURABLE MICRO FLOWGUIDE DEVICE

FIELD OF THE INVENTION

The present invention relates to a micro flowguide device, especially to a configurable/programmable micro flowguide device provided with electrolytic bubble actuator. The micro flowguide device of this invention may be used in a variety of medical, chemical, environmental, electronic, pharmaceutical, agricultural or military microfluidic applications.

BACKGROUND OF THE INVENTION

In the field of the miniaturized microfluidic device, flow control components with no-moving-parts elements play a significant role in simplifying the device fabrication/operation complexity and reducing mechanical wear/reliability problems. Among them, micro flowguides, which guide flow to a predefined route, are useful in many microfluidic applications including cell manipulation, particle sorting, drug delivery, and extraction/mixing of (bio) chemical samples . . . etc. Disclosed in the prior arts, mechanisms for micro moving-parts (or no-moving-parts) flow control components include:

1. Thermally actuated flow branching: Non-uniform heating a moving fluid causes a variation of viscosity of fluid across the channel section, and hence an asymmetric flow velocity profile across the channel. A flow can then be directed toward the branch channel along the side of lower velocity profile.
2. Thermal bubble valve: Locally heating a moving fluid to its boiling point generates localized steam bubbles. Bubbles, which are usually carried downstream and constrained at a converged channel, will cause discontinued streamlines and reduce flow velocity and thus act as a valve.
3. Magneto-hydrodynamic (MHD) flow: Applying a magnetic field to a flow carrying moving electric charges generates a driving force to move the fluid to a direction defined by the cross-product of moving charges and the magnetic field. (Electrokinetic flow is another similar principle used to direct flow toward predefined electrical field.)
4. Thermal gelatin valve: A ball valve operating according to the volumetric expansion or contraction of a temperature sensitive gelatin that acts as the ball of the valve.
5. Electrolysis-bubble actuated gate valve: A flow valve consisting a laterally moving piston that serves as the ball of a valve. The piston is actuated by 2-state buckling deformation of tether beams connected to it. Electrolytic bubbles will generate small push force on the buckling beams and larger buckling deformation will snap the piston to the desired position into the flow channel and close the valve.
6. Mechanically driven valves: Valve driven directly by mechanical force and structures.

In the aforementioned arts, the thermal gelatin valve, the electrolysis-bubble actuated gate valve and the mechanically driven valves are prepared with special actuation materials or are provided with internal or external moveable parts to control a flow inside a micro channel. This does not only increase the number of working elements/components and their required space to control a flow in a micro channel but also makes the high-density integration of such components and external system more complicated. Flow control using thermally actuated flow branching, thermal bubble valve, and the magneto-hydrodynamic flow are able to provide a simpler, self-embedded and no-moving-parts mechanisms. However, the operational temperature or the operational voltages (or currents) of these arts may be inapplicable to some (bio)chemical liquid or reagents.

Many development efforts have been dedicated to microfluidic array device in which fluids are delivered according to pre-defined flow rates and directions through series of steps to complete necessary (bio)chemical reactions. On the microfluidic array device, micro channels or micro conduits can only passively link in parallel or in series multiple reactions each of which requires its own microfluidic components to complete specific task. In contrast to these functional-specific components, flowguide becomes a general multiplexing component to provide an active conducting of fluids in an integrated microfluidic conduit network. Therefore it becomes very desirable in a microfluidic array device to have active control over fluid conducting, flow rate, and dwelling time (or charging time) . . . etc in order to improve device controllability, application flexibility and reactive process accuracy.

It is thus desired to have a novel and simple micro flowguide preferably with no-moving-part elements to maintain cost effectiveness of a usually disposable/or portable microfluidic device.

It is also desired to have a novel micro flowguide capable of active multiplexing flows without extra needs of using other complicated external actuation mechanisms.

It is also desired to have a novel micro flowguide where the operational mechanism will be compatible to the reactions performed inside the microfluidic array device.

It is also desired to have a small and inexpensive micro flowguide that is capable of being flexibly integrated at high density into a microfluidic array device.

It is also desired to have a configurable/programmable micro flowguide in order to enhance overall flow control flexibility and reaction accuracy in an integrated microfluidic conduit network.

It is also desired to provide an easy access to activate a micro flowguide for a software man-machine interface.

OBJECTIVES OF THE INVENTION

One objective of this invention is to provide a novel micro flowguide with no-moving-part working elements/components to simplify miniaturized fabrication process and to save its concomitant cost.

Another objective of this invention is to provide a novel micro flowguide with a simple and independent mechanism to actively define the ON/OFF states of a microfluidic conduit branch.

Another objective of this invention is to provide a micro flowguide that can work on DC source at low power consumption.

Another objective of this invention is to provide a novel micro flowguide where the operational mechanism will be confined locally and generally compatible to required reactions to be performed in a microfluidic array device.

Another objective of this invention is to provide a low-cost and simple micro flowguide device for high-density integration into a microfluidic array device.

Another objective of this invention is to provide a micro flowguide which function can be configured to formulate a desired routing of flows through micro conduit branches or defined in a timeline by software interface in order to provide special fluid conducting sequences.

SUMMARY OF THE INVENTION

A "flowguide" is hereby defined as a component/device that can direct a conduit flow to the predefined paths. When multiple paths are simultaneously available for a single upstream flow, a flowguide opens a connection for this upstream flow to a desired downstream flow path. In another word, the undesired connections must be closed to avoid too much cross talk. When there are only 2 downstream choices available, the flowguide acts like a flip-flop device that provides one of the 2 output states for the upstream flow signal. Therefore the flowguide could be considered a switch or a logic device in an analogy to those used in logic circuit or optical communication.

Explained by this invention, a configurable/programmable micro flowguide adopts the principle of micro electrolytic bubble actuator as its working mechanism to activate the On/Off State of a micro conduit branch over which the micro flowguide straddles. The On state defines the availability of the micro conduit branch to transfer fluids while the Off state defines the unavailability of the micro conduit branch to transfer fluids.

When an electrical logic signal connected to the micro flowguide's accompanying DC power relay maintains at low/high level, the DC source will be disconnected/connected to the micro flowguide respectively to turn On/Off the micro conduit branch. In order to implement high-density distribution of such a micro flowguide into a micro conduit network, this micro flowguide is designed without moving-part elements so that less space and simpler fabrication process are required.

The electrolytic bubbles are generated through a localized electrolytic reaction. The exposure of a set of DC-source-connected electrodes inside a conduit branch is used to enable a local electrolysis and to generate gas bubbles. Accumulated bubbles will be trapped and kept at several corner traps, in principle, like a water hammer absorption air reservoir, of the invented flowguide. When the backward pressure of trapped bubbles is rising to the level of forward pressure head, flow speed reduces to zero and channel branch is shut down. Typical shutdown response time for the invented flowguide design is about 1~2 seconds. By enabling the Off state of channel branches, only channels with On state will be available to conduct channel fluids through a micro fluidic conduit network of a microfluidic array device.

Appropriate placement of such a flowguide in a microfluidic channel network can be used to configure a user-defined route that links inlet, network nodes where pre-defined (bio)chemical actions are held in a timeline, and the final outlet, making such a device platform configurable for different applications and fluid conducting sequences.

The above objectives and advantages of this invention may be clearly understood from the detailed description that follows and by referring to the drawings provided thereafter:

DETAILED DESCRIPTION OF THE INVENTION

The present invention discloses a novel configurable/programmable micro flowguide device and method of preparation thereof.

Although it is not intended to limit the applicable scope of this invention, it is found that the fluids used in (bio) chemical reaction will usually inherit particular electro-chemical characteristics. In other words, some particular electrolytes may be contained in the fluids used with (bio) chemical reactions. Applying a current to a (bio)chemical reactive fluid in a confined area will cause rapid generation of electrolytic bubbles. The generation of electrolytic bubbles in such a manner will not heat up the reactive medium to such an extent that the reagents will be damaged. The bubbles so generated are of small sizes at the initial stage but will later coalesce into one another to form larger ones. Bubbles will at last reach force balance between forward/backward pressure head difference, viscosity, surface tension, and capillary force. Providing bubble traps at the corner of a turning path with an acute angle to retard large bubble movement will form a flow resistor and damper. Grown bubbles at each trap will attract more newly generated small bubbles and at last cause catastrophic traffic jam of bubble movement along the flow path and shut the flow path down. And at the same time the salt bridge is also shut down due to the bubble isolation of exchange of cations and anions between electrodes. Thus no electrical current and fluid can flow through a broken salt bridge.

Thus every conduit between 2 (bio)chemical reaction sites can be defined as "On" state or "Off" state by deactivating or activating rapid electrolysis within the invented flowguide device. Only an "On" conduit can conduct fluids without breaking the streamlines. Routing all open conduit branches can then define a user-specific fluid conducting sequences from input to output and achieve a configurable/programmable (bio)reactions in a microfluidic array device.

In the followings, examples will be given to illustrate the invented micro flowguide device and how reaction fluids can be transported using the invented micro flowguide device.

Figure 1:
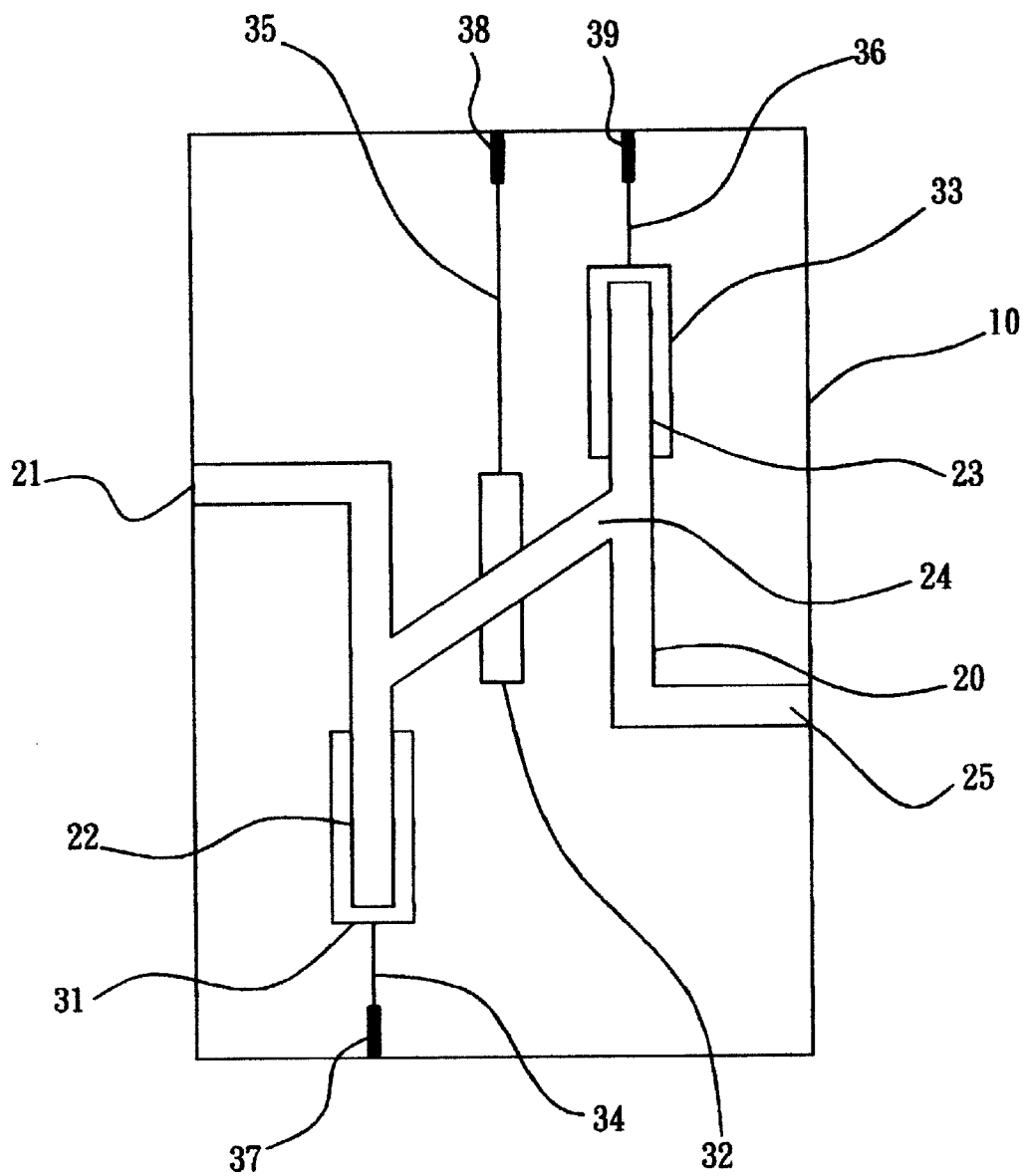
FIG. 1 illustrates the top plan view of the micro flowguide device of this invention.

FIG. 1 illustrates the top plan view of the micro flowguide device of this invention. As shown in this figure, the whole micro flowguide device of this invention is fabricated on a substrate 10. The substrate 10 may be made of any suitable material to support the body structure of such a micro flowguide device. Suitable materials for the substrate 10 include glass, silicon, plastics . . . etc. Electrodes are buried beneath the channel body. Sealed on top of the channel body can be, but has not to be, a PET (polyethylene terephthalate) adhesive film.

The invented micro flowguide device includes a micro channel 20 provided on the substrate 10. The micro channel 20 enters the micro flowguide from an inlet 21 and leaves it from an outlet 25. Besides, the micro flowguide consists of 2 bubble traps 22, 23 and a bridge channel 24 between them. A pressure source (not shown) is connected to the inlet 21 to supply a positive pressure head to the moving fluid, such that the fluid can be conducted from the inlet 21 to the outlet 25 through the bridge channel 24. The pressure source may be a pneumatic pressure source, a liquid pressure source or other types of driving forces (electrical, magnetic, thermal, chemical etc.), as long as the driving force supplied by the presure head is able to move the channel fluid through micro channel 20.

Provided under the first bubble trap 22 is the first electrode 31 and under the second bubble trap 23 is the second electrode 33. In addition, a third electrode 32 is provided under the bridge channel 24. Electrodes are respectively connected to pads 37, 39, 38 located at edges of the substrate 10, through extended conductors 34, 36 and 35. At least a part of the e lodes 31, 32 and 33 is exposed to fluid moving inside the micro channel 20. When a fluid flows through the micro channel 20 over the fist bubble trap 22, the bridge channel 24 and/or the second bubble trap 23, electrolysis between the electrodes 31, 32 and 33 will, respectively, take place and current will be conducted through the fluid. The electrodes 31, 32 and 33, the extended conductors 34, 35, 36 and the electrical contact pads 37, 38, 39 can be made of the same or different conducting materials, preferably highly electrically conducting and chemically inert materials. They can be fabricated on the substrate 20 in one single step with any suitable method, including conductive ink/paste printing, metal sputtering . . . etc. If necessary an electrical insulation layer or a protection layer can be coated on the sure of these electrodes, extended conductors and/or the pads. When this insulation layer is made on the electrodes 31, 32 33, and/or electrical pads, 37, 38, 39, electrical contact windows have to be patterned and opened through the channel body, so that the electrolytic currents between the channel fluids and the electrodes 31, 32 and 33 can be established. Thus can external electrical access to contact pads be also established.

In order to generate electrolytic bubbles in a conducting fluid, the first electrode 31 and the second electrode 33 are preferably connected to one polarity of a DC source (not shown), while the third electrode 32 is connected to the other polarity of the same DC source. As a result, the first electrode 31 and the third electrode 32 are connected to the opposite polarities, and so are the second electrode 33 and the third electrode 32.

Output state, Off, needs to be activated by electrolytic bubbles while the output state, On, is normally available. When the flowguide is maintained at Off state, no flow is conducted between inlet 21 and outlet 25 and vice versa.

Fluid to be transferred through the invented micro flowguide is induced into the micro channel 20 from the inlet 21. The driving force for the fluid is in general a positive pressure head. The fluid is usually a mixture of solutions containing (bio)chemical reagents, sample extractions, liquid buffers, and/or colloids . . . etc. which will be required at specified locations of a microfluidic array device. Potential applications which can be performed in a microfluidic array device includes, but not limited to, heating, mixing, chemical reactions, immunoassay, sediment, extraction, drying, and electrophoresis . . . etc. Electrolytes contained in the mixture solution can be used to maintain appropriate pH value and osmosis environment for many (bio)chemical reactions. For example, cell culture medium, such as RPMI-1640, is a frequently used fluid in flow cytometry and micro tissue array device. The electrolytes dissolved in such a general cell culture medium can provide a fairly good working condition for the invented micro flowguide.

When the fluid is introduced into the micro channel 20 from the inlet 21 and a positive pressure head is supplied to the fluid by the driving source, the fluid will flow to the first bubble trap 22, and then to the bridge channel 24. When a part of the fluid is at the first bubble trap 22 and another part is at the bridge channel 24, a DC source is connected to the first electrode 31 and the third electrode 32. In applications, the first electrode 31 and the third electrode 32 are connected to different polarities of a DC source, respectively, and so are the second electrode 32 and the third electrode 33, while the polarities of the electrodes 31, 32 and 33 may be decided according to the requirements in an application. In general, bubbles can be generated when a part of the electrolyte-contained solution is in contact with an electrode of one polarity and the other part of the solution is in contact with another electrode of the opposite polarity of a DC source.

When current is supplied to such a conducting fluid, electrolytic reaction will take place with small bubbles generated near electrode(s). As described before, electrolytic bubble movement will stop when the backward resistance cancels out the forward driving force. Accumulated bubbles trapped between pair(s) of bubble traps will also cut off the free ion exchange through bridge channel 24 to constrain further current supply into the solution between 2 electrodes. As the flow rate reduces to zero at outlet 25 after electrolysis is fully completed, an Off state is latched from normally On state and maintains without further consuming power required for electrolysis.

Figure 2:
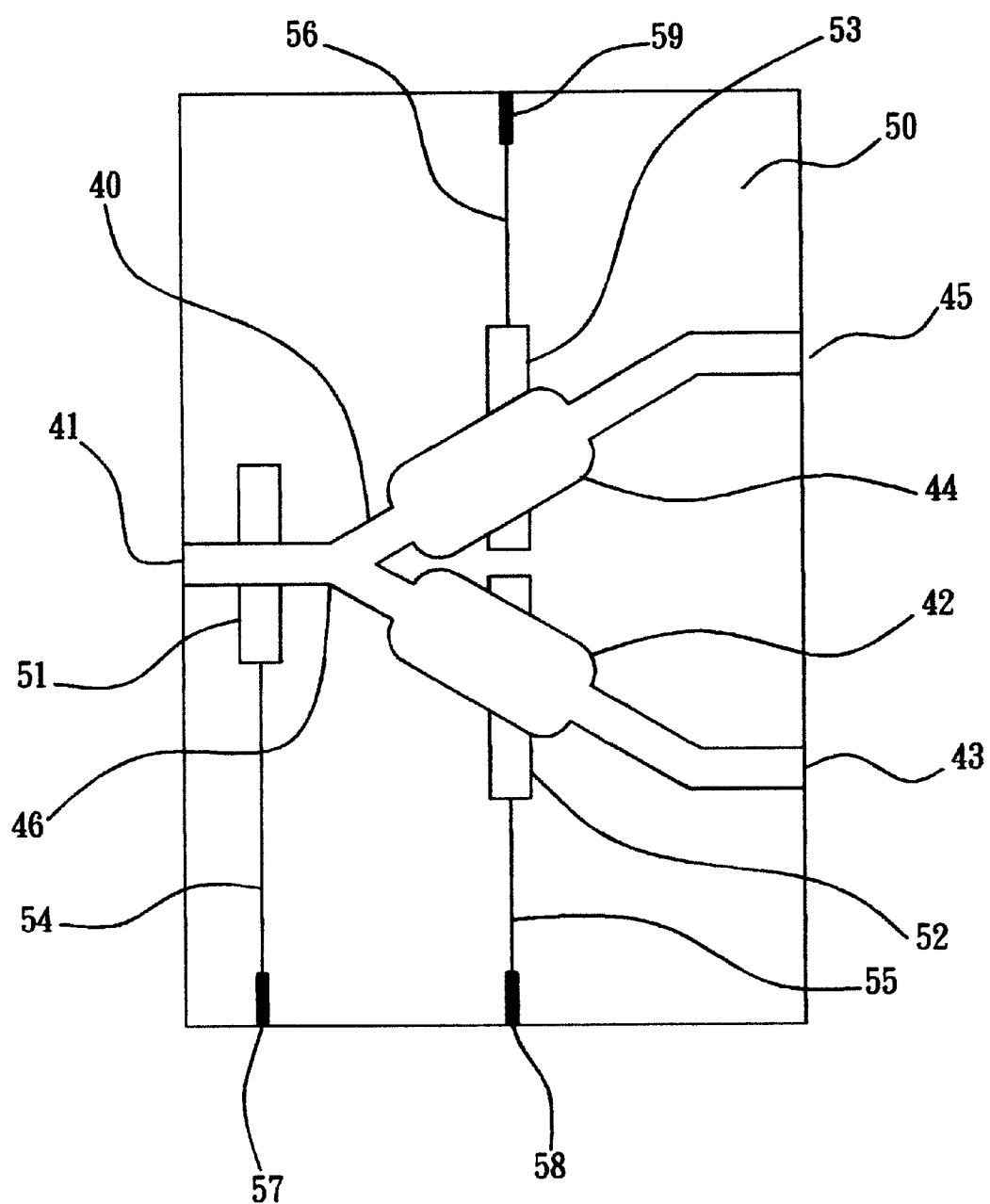
FIG. 2 illustrates the top plan view of a micro switch using the micro flowguide device of this invention.

FIG. 2 shows the plan view of a micro switch using the micro flowguide device of this invention. As shown in this figure, when the micro flowguide device of this invention is used as a micro switch, a plurality of micro flowguide devices are provided in a micro channel 40 prepared in a substrate 50. The micro channel 40 has an inlet 41 and is divided into two branches from a node 46, each branch having a micro valve including a bubble trap 42, 44 and an outlet 43, 45. The structure of the substrate, the micro channel the electrodes, the conductors and the pads are similar to that of the above. Detailed description is thus omitted.

When using the micro switch, a fluid is introduced into the micro channel 40 from the inlet 41 and proceeds to pass the node 46, entering into the first micro valve 42 and the second micro valve 44, which respectively include a bubble trap. Operate the micro valves 42 and 44 in the manner as described above, such that large bubble(s) is generated at areas adjacent to a selected micro valve to form a resist preventing the fluid to proceed further to the bubble trap of the selected micro valve. As a result, the fluid can only proceed to the other branch and flow to the outlet belonging to that branch.

By using this operation, the micro flowguide device of this invention functions as a one-time micro switch in a micro channel.

Figure 3:
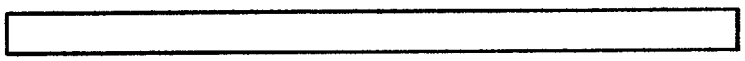
FIG. 3 illustrates the steps in the preparation of the invented micro flowguide.
Figure 3:
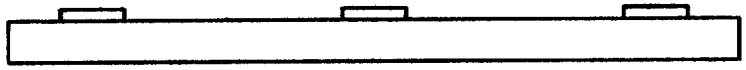
Figure 3:
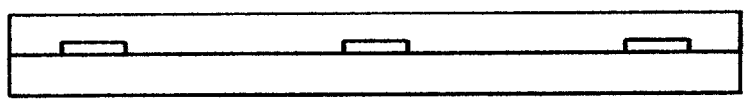
Figure 3:
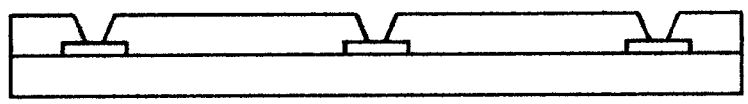
Figure 3:
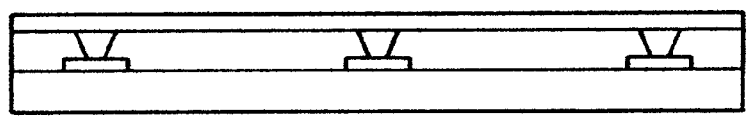
Figure 3:
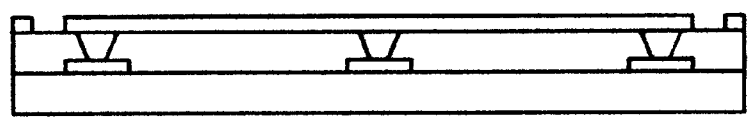

FIG. 3 illustrates the steps in the preparation of the invented micro flowguide. As shown in this figure, in the preparation of the micro flowguide device of this invention, at 301 a glass/silicon or ceramic substrate is first prepared. At 302, electrodes, extended conductors and contact pads can be made by patterned metal sputtering or screen-printing of conductive paste/ink followed by thermal treatment. Then at 303, the body layer of micro channel is then made on the substrate and aligned with the electrodes. At 304, the body of the micro channel is formed in the body layer. A coated and patterned photo-resist after post-baking develops the required micro channels. Hot embossed polymer channel body can also be made to attach to the substrate. At 305, if required, an adhesive film can be attached on the top channel body to form sealed channels at last At 306, inlets and outlets of the micro channel is prepared. The micro flowguide device of this invention is thus prepared.

EFFECTS OF THE INVENTION

The invented micro flowguide requires no moving parts. Problems resulted from mechanical wear and jam can hence be avoided. Electrolytic bubble actuation requires only a simple connection of a DC source to user-defined electrodes of the invented micro flowguide, which can mostly be done by a more user-friendly software interface. The fabrication process is designed for simplicity, flexible high-density integration to devices made by more complex miniaturization process, power saving and cost reduction for disposable/portable purpose.

The most fundamental working principle of the invented micro flowguide is an equivalent switch for microfluidic circuit. Based on this principle, more complex one-time flip-flops, latches, and multiplexers can be made using the invented micro flowguide in series or in parallel without difficulty. With these components available, more advanced flow control in a microfluidic array device can therefore be achieved. In addition the electrolytic bubble actuation requires less power, works at a lower temperature and provides larger working stroke than thermal bubble actuation. With bubble trap design, actuation requires no convergent conduit design and can rapidly accumulate and stop to provide reasonable response performance for operating a micro flowguide.

As the present invention has been shown and described with reference to preferred embodiments thereof those skilled in relevant arts will recognize that other changes may be made therein without departing from the concept and scope of the invention.

What is claimed is:

1. A micro flowguide device, comprising:

a micro channel, allowing a fluid to flow;

said micro channel comprising at least one bubble trap formed in said micro channel to retard bubbles positioned in said bubble trap;

an electrolytic bubble generating device to cause the generating of bubbles in said fluid by an electrolytic reaction when an electric current is applied to said fluid; and a pressure source to supply a suited pressure to said fluid passing through said micro channel;

characterized in that said electrolytic bubble generating device causes bubbles to be generated at areas adjacent to said at least one bubble trap.

2. The micro channel flow guiding device as claim 1, wherein said bubble trap comprises a sharp turning section of said micro channel.

3. The micro channel flow guiding device as claim 1, where in said bubble trap comprises a part of said micro channel which retards and accumulates bubbles.

4. The micro channel flow guiding device as claim 1, wherein said electrolytic bubble generating device comprises at least one electrode positioned adjacent to said bubble trap.

5. The micro channel flow guiding device as claim 4, wherein at least a portion of said electrode comprises contacts with said fluid.

* * * * *